United States Patent [19]

Kafchinski et al.

[11] Patent Number: 5,043,113
[45] Date of Patent: Aug. 27, 1991

[54] PROCESS FOR FORMATION OF HALOGENATED POLYMERIC MICROPOROUS MEMBRANES HAVING IMPROVED STRENGTH PROPERTIES

[75] Inventors: Edward R. Kafchinski, Winfield; Tai-Shung Chung, Randolph, both of N.J.; Hubert Bader; James J. Lowery, both of Charlotte, N.C.

[73] Assignee: Hoechst Celanese Corp., Somerville, N.J.

[21] Appl. No.: 558,992

[22] Filed: Jul. 27, 1990

Related U.S. Application Data

[63] Continuation-in-part of Ser. No. 437,052, Nov. 15, 1989, which is a continuation of Ser. No. 228,883, Aug. 5, 1988, Pat. No. 4,910,106.

[51] Int. Cl.⁵ ............................................. B29C 67/00
[52] U.S. Cl. .................................... 265/41; 264/49; 264/175; 264/216; 264/234; 264/344; 264/345
[58] Field of Search .................. 264/41, 49, 175, 234, 264/340, 344, 216, 345

[56] References Cited

U.S. PATENT DOCUMENTS

| | | |
|---|---|---|
| 2,806,256 | 9/1957 | Smith-Johannsen .................... 18/57 |
| 3,123,654 | 3/1964 | Malischewski ...................... 429/254 |
| 3,354,247 | 1/1967 | Zenender et al. ................... 429/254 |
| 3,407,249 | 10/1968 | Landi .................................. 264/49 |
| 3,661,645 | 5/1972 | Strier et al. ......................... 264/49 |
| 3,679,614 | 7/1972 | Shah et al. .......................... 264/49 |
| 3,929,450 | 12/1975 | Nakamura et al. ................... 264/49 |
| 3,929,950 | 12/1975 | Nakamura ............................ 264/49 |
| 3,973,398 | 2/1961 | Hubbard et al. ..................... 429/254 |
| 4,342,636 | 8/1982 | Chang et al. ........................ 264/49 |
| 4,623,670 | 11/1986 | Mutoh et al. .................... 210/520.36 |
| 4,629,666 | 12/1986 | Schlaikjer ........................... 429/254 |
| 4,702,836 | 10/1987 | Mutoh et al. .................... 210/500.23 |
| 4,705,545 | 11/1987 | Polak et al. ........................ 264/185 |

Primary Examiner—Hubert C. Lorin
Attorney, Agent, or Firm—Joseph M. Mazzarese

[57] ABSTRACT

A process for producing a polyhalogenated microporous film having a very narrow pore size distribution and good temperature and chemical resistance. The process involves blending a polyhalogenated copolymer with a polyethyloxazoline utilizing a solvent which is a nonsolvent for the polyhalogenated copolymer but a solvent for polyethyloxazoline, forming a film from the blend, drying the film, heating the film to a temperature at or above the melting point of the polyhalogenated copolymer and under conditions such that the microparticulate particles at their points of mutual contact will neck together to form a relatively continuous matrix and extracting the polyethyloxazoline from the film utilizing a solvent for the binder particle to form a microporous film.

30 Claims, 1 Drawing Sheet

PROCESS FOR FORMATION OF HALOGENATED POLYMERIC MICROPOROUS MEMBRANES HAVING IMPROVED STRENGTH PROPERTIES

CROSS REFERENCE TO RELATED APPLICATIONS

This application is a continuation in part of application Ser. No. 437,052, filed Nov. 15, 1989, which was a continuation of application Ser. No. 228,883, filed Aug. 5, 1988, now U.S. Pat. No. 4,910,106.

BACKGROUND OF INVENTION

1. Field of Invention

This invention relates to microporous, polyhalogenated, polymeric films. More particularly, this invention relates to polyhalogenated, polymeric films, as described hereafter, which are prepared utilizing micro powders.

2. Prior Art

Microporous films are used in a wide range of applications, generally to provide barriers which are selective to the passage of various materials such ions or molecules. For example, microporous films may be used as battery separators, ion-exchange membranes and electrolysis membranes, as well as in breathable fabrics and medical and packaging applications. Many prior art films have been formed from polyolefins which can be rendered microporous by the extraction of a soluble component or by other processes. Among the polymers which can conveniently be rendered microporous by these processes are included polyethylene and polypropylene. Films of these polymers, while chemically inert towards many acids, alkalis and reactive metals, are, none-the-less, incompatible with a number of solvents which are commonly used. Moreover, the maximum operating temperature for polyolefins of this type is approximately 120° C. As a result, these films cannot be employed where high temperature performance is necessary.

U.S. Pat. No. 4,910,106, a predecessor patent to this invention, assigned to the same assignee, discloses a microporous film formed from polyhalogenated copolymers similar to those used in this process. The preferred binder polymer used in the '106 patent was a polycarbonate dispersed in methylene chloride. In addition, polyarylates, polysulfones, and polymethylmethacrylates were disclosed as permissible binder polymer. Because of the environmental problems associated with polycarbonates and methylene chloride, an alternative extractable material was needed.

Application Ser. No. 437,052, assigned to the same assignee, discloses the process of U.S. Pat. No. 4,910,106 again using as the preferred binder polymer polycarbonate with methylene chloride as the solvent for the polycarbonate material.

U.S. Pat. No. 3,930,979 discloses a process for the manufacture of porous diaphragms wherein said process consists of forming a membrane from synthetic materials, specifically PTFE, wherein said PTFE contains a solid particulate additive and removing the solid particulate additive from the membrane by treating the sheet with an acid containing a corrosion inhibiter. This patent does not disclose ETFE or the calendering of ETFE.

The preparation and use of porous, polyfluorinated, microporous films is known. For example, U.S. Pat. No. 3,407,249 discloses a porous polytetrafluoroethylene (Teflon) film useful as a battery separator. The patent describes the use of Teflon particles having diameters in the range of about 0.1 to 0.5 microns. According to the patent, these particles are mixed with a polymer such as polymethylmethacrylate, hot-milled and extruded. The polymethylmethacrylate polymer is then dissolved from the extruded film to produce a microporous product.

The microporous films prepared in the '249 patent are significantly different from the films of the instant invention in that they are "extensively fibrillated", i.e., the pores of the films of the '249 patent are in reality slits or "cracks" in the film. Thus, the slit pores of the films of the '249 patent do not lend themselves to the uniform separation of ionic materials such as is necessary with battery separators. Moreover, the films prepared in the '249 patent are primarily based upon polytetrafluoroethylene films and do not possess the superior properties of the films prepared according to the instant invention.

U.S. Pat. No. 2,806,256 discloses the preparation of battery separators based on polytetrafluoroethylene and polytrifluoromonochloroethylene polymers There is no disclosure in this patent to the use of the specific polymers disclosed as useful herein.

Other prior art, microporous, polyfluorinated polymers, like the materials described in the '249 patent, have suffered from a lack of uniform pore size distribution. While the films of the instant invention offer a pore size distribution of about 0.1 to 1 microns, the pore size distribution shown in prior art films is not nearly as narrow nor are the pores as small; the average pore diameter range of many prior films ranging from about 1 to 5 microns. Another important characteristic present in the films of the instant invention, but found lacking in prior art films, is transverse direction, tensile strength. Prior art membranes have generally been extremely weak in the transverse direction due either to their highly fibrillated or highly drawn nature.

U.S. Pat. No. 3,929,950 discloses the formation of porous synthetic films based upon ethylene/tetrafluoroethylene copolymers (ETFE). In the '950 patent another polymer such as polypropylene is blended into the polymer melt and then dissolved out again, after film formation, to produce a microporous film. However, the '950 patent does not disclose the particle size of the ETFE copolymer which is utilized. Also, because of the extensive stretching required, the films described in this patent are anisotropic, highly oriented and accordingly have relatively wide, non-uniform pores. The films of the instant invention, on the other hand, exhibit a very narrow pore size distribution and, at the same time, the films are not anisotropic in nature.

Other patents which disclose polyfluorinated microporous films include U.S. Pat. Nos. 4,702,836, 3,661,645, 3,679,614, 4,623,670 and 4,342,636.

Other prior art process have used ionic materials, particularly lithium salts in rendering polyhalogenated films microporous. However, the presence of even trace amounts of these ionic salts in certain end uses for microporous films such as battery separators may be deleterious. Moreover, many lithium salts are hygroscopic and therefore tend to undesirably attract and hold water within films prepared utilizing these salts. As a result, dielectic breakdown of battery separators made from microporous films based upon lithium salts may occur. Films of the instant invention, on the other hand, are not prepared based upon ionic salts and accordingly do not suffer from the disadvantages demonstrated by many prior art polyhalogenated microporous films.

Accordingly, it is an object of this invention to disclose a process for the preparation of microporous films having relativity uniform pore sizes.

It is another object of this invention to disclose a process for the preparation of polyhalogenated microporous films having relatively small pore diameters.

It is another object of the instant invention to disclose a process for the preparation of essentially ion free films which do not contain residues of ionic salts.

It is also an object of this invention to disclose a process for the preparation of microporous polyhalogenated films having improved transverse direction strength when compared to prior art, polyhalogenated, microporous films.

It is also an object of this invention to disclose a process for the preparation of microporous films which are not highly oriented and which are based upon polyhalogenated copolymers and polyethyloxaline.

It is yet another object of this invention to prepare films which are useful in high temperature applications and are substantially inert to chemically aggressive substances such as alkali and alkaline earth metals.

These and other objectives are obtained by preparing the compositions of the instant invention utilizing the process described below.

SUMMARY OF INVENTION

Figure 1:
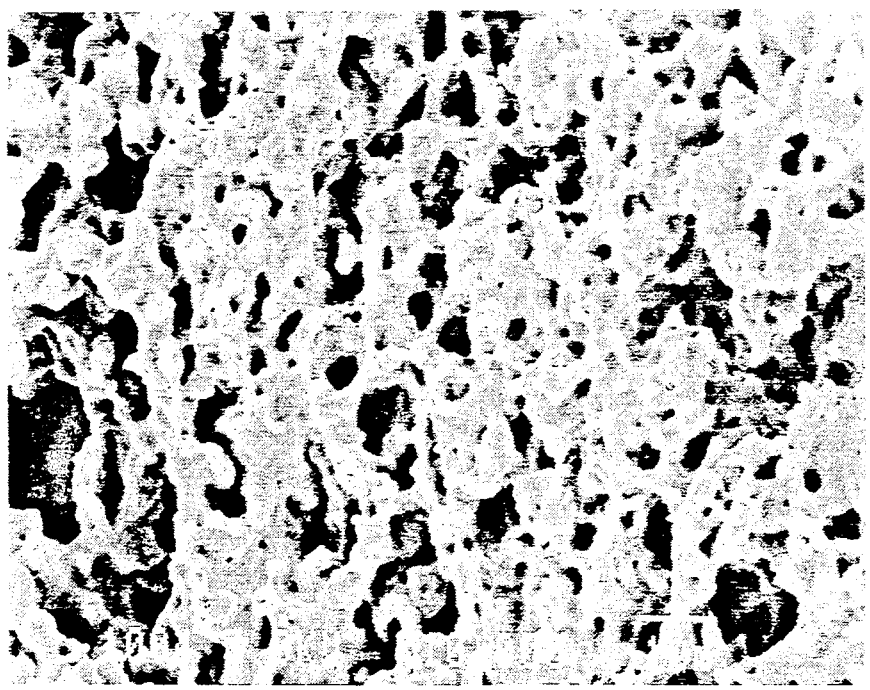
FIG. 1 shows an electron micrograph (10,000 x) of a cross-section of a film prepared according to the present invention.

The instant invention involves a process for the preparation of microporous polymeric films which are comprised of a polyhalocopolymer in which the repeating units are —$(C_a H_{2a})$— and —$(C_b X_{2b})$—, wherein each X independently represents fluorine or chlorine and the value of a is 1-6 and b is 1-6. The film prepared from this copolymer have a porosity up to about 75 percent and having pore sizes of from about 0.1 to about 5 microns.

The films of the instant invention are prepared by a novel process which comprises forming a suspension of the polyhalocopolymers of the instant invention utilizing micropowders having a particle size of less than about 2.0 microns, mixing the suspension with polyethyloxazoline forming a film from said mixture, evaporating the solvent from the mixture, uniformly heating the resulting film to irreversibly agglomerate a portion of the polyhalocopolymers, and treating the heated film with a solvent for polyethyloxaline to extract the binder polymer and render the film microporous.

The resulting microporous film is useful in a wide variety of applications including as a battery separator. As such this film exhibits good chemical stability, provides pores of uniform but small size, possesses excellent transverse direction strength, and is essentially ion-free in character.

DETAILED DESCRIPTION OF PHOTOGRAPHS

The photograph which is FIG. 1, shows an example of the microporous film of the instant invention. FIG. 1 shows a cross-section view of a sample of the film of the instant invention. This photograph is made by a scanning electron microscope at 10,000 magnification.

DETAILED DESCRIPTION OF INVENTION

The first polymer of the instant invention is a polyhalocopolymer in which the repeating units are —$(C_a H_{2a})$— and —$(C_b X_{2b})$— wherein each X, independently, represents fluorine or chlorine and wherein the value of a is 1-6 and b is 1-6.

Preferably the first polymer of the instant invention is selected from the group consisting of ethylene/tetrafluoroethylene copolymers, ethylene/chlorotrifluoroethylene copolymers and mixtures thereof. These polymers and copolymers all possess excellent chemical and thermal resistance and exhibit improved mechanical properties when used as the microporous films of the instant invention.

The ethylene/tetrafluoroethylene copolymer is a copolymer in which ethylene and tetrafluoroethylene, principally are combined alternatively. The melting points of these copolymers vary, depending upon the compositional proportion of ethylene to tetrafluoroethylene, from about 200° C. to about 280° C. Those copolymers having the highest melting points are more preferred than those having lower melting points. Commercially available products include Hostaflon ® materials produced by Hoechst, Inc.

The ethylene/chlorotrifluoroethylene copolymer is a copolymer wherein ethylene and chlorotrifluoroethylene, principally, are combined alternately. The melting points of these copolymers also vary according to the proportion of ethylene to chlorotrifluoroethylene moieties and may range from about 200° to 260° C. Again the polymers having the higher melting points are preferred. Commercially available products of this type include those such as Halar produced by Allied Chemical Corporation.

Regardless of which of the polyhalogenated polymers or copolymers (hereafter the polymers and copolymers are referred to jointly as "copolymers") is chosen herein, the copolymer should have a number average molecular weight of at least about 10,000. preferably at least about 50,000. Furthermore it is essential that the copolymers which are utilized be employed in their microparticulate form with particle size diameters, on the average, of no greater than about 2.0 microns, preferably less than about 1.0 microns and most preferably less than about 0.5 microns.

Finally, in most cases the polyhalogenated copolymers of the instant invention are obtained commercially in the form of either a microparticulate powder, as described above, or in the form of a surfactant stabilized, dispersion of the above microparticles in a nonsolvent for the polyhalogenated copolymer, such as water. In the later case, in order to form the microporous films of the instant invention, it is preferred that any surfactant or dispersant be removed and that the nonsolvent in which the polyhalogenated copolymer is dispersed be a solvent for the second or binder polymer. Accordingly, if the polyhalogenated copolymer is supplied in a solvent in which the binder polymer is not soluble, then both the solvent in which the polyhalogenated copolymer is supplied and the surfactant should be removed and the solvent replaced with a solvent, such as acetone, for example, which would dissolve the binder polymer. While it is preferred to remove the surfactant at this point in the processing, in order to prepare the films of the instant invention, surfactant removal at this point is not absolutely necessary. For example, if the surfactant is soluble in the solvent that is used to extract the binder polymer as described hereafter, then the surfactant removal step may be combined with the binder polymer extraction step.

The second or binder polymer of the instant invention is a polymer which is immiscible, in the melt phase, with the polyhalogenated copolymer. If the binder polymer and the polyhalogenated polymer are miscible, i.e., if the binder polymer actually becomes solubilized in the first polymer, in the melt phase, such that the microparticulate nature of the polyhalogenated copolymer dispersion is destroyed, then it will be impossible to form a microporous film of the type described herein.

Finally, the polyhalogenated copolymer and the binder polymer must not have the same solvent solubility characteristics. That is, it is necessary that there be at least one solvent for the binder polymer in which the polyhalogenated copolymer is insoluble, but dispersible.

Examples of polymers which may be useful as the binder polymers of this invention include polycarbonates such as Makrolon TM (formerly Merlon) which is available from the Mobay Corporation, polyarylates, polysulfones, polymethylmethacrylates, polyethyloxazoline and other similar polymers which meet the requirements described above. Preferably the binder polymer is a polyethyloxazoline polymer.

Film Fabrication

The polyhalogenated copolymers of the instant invention which are utilized to form the microporous films described herein, as pointed out above, are usually obtained in the form of a dispersion, generally an aqueous dispersion. Usually these dispersions are furnished at about the 12 to 25 percent solids weight level and are stabilized utilizing various surfactants such as ammoniumperfluoroctanoate and ammoniumoxalate and manganeseacetate. However, in order to utilize these dispersions in the process of the instant invention, it is necessary to remove the surfactant by washing the dispersion repeatedly with a solvent for the surfactant It may also be necessary to remove the water or other solvent in which the polyhalogenated copolymer is dispersed depending upon the solubility of the binder polymer in the dispersing solvent. If the binder polymer is insoluble in the dispersing solvent then the dispersing solvent must be replaced with another solvent in which the polyhalogenated copolymer is dispersible but in which the binder polymer is soluble. For example, when a polyethyloxazoline polymer is used as the binder polymer and ethylene/tetrafluoroethylene (ETFE) is used as the polyhalogenated copolymer, the polyhalogenated copolymer aqueous dispersion is initially treated with acetone which removes the surfactant and, at the same time, precipitates the polyhalogenated copolymer from the aqueous dispersion. After filtration and repeated washing with acetone, the polyhalogenated copolymer can then be temporarily dispersed in acetone at approximately the 10 to 50 percent by weight solids level. Since polyethyloxazoline polymers are generally soluble in acetone, the acetone dispersion of the ETFE may then be used in conjunction with an acetone solution of the polyethyloxazoline or in a preferred embodiment the polyethyloxazoline is added directly to the ETFE/acetone dispersion.

Polyethyloxazoline (PEOX) produced by Dow Chemical is available in three different viscosities, known as PEOX 50 TM, PEOX 200 TM and PEOX 500 TM with the solution viscosity at a 10 percent concentration at 25° C. at 10 plus or minus 2, 40 plus or minus 5, and 100 plus or minus 20 respectively. PEOX is highly soluble with water, although also soluble in many other solvents including ethylene glycol, methanol, ethanol, acetone, acetonitrile, etc.

The amount of the binder polymer which is added to the polyhalogenated copolymer, on a solids basis, should range from about 20 percent to about 65 percent, preferably, about 30 to about 50 percent by weight. Below the 20 percent binder polymer level, after film formation and solvent evaporation, flakey as cast films are produced because sufficient binding of the polyhalogenated copolymer powder does not occur. At binder polymer levels of higher than about 65 percent, the films, after extraction with a solvent for the binder polymer, are too porous to permit use as described herein. The above weight percentages are based upon the use of the polyethyloxazoline described in Example 1 which has a density of approximately 1.14 g/cc.

The polyhalogenated copolymer suspension as prepared above and the binder polymer solution are mixed together under high shear and filtered under nitrogen at temperatures well below the melting point of either the binder polymer or the polyhalogenated copolymer. High shear mixing is believed to be necessary in order to ensure that the polyhalogenated copolymer is dispersed throughout the binder polymer. Adequate dispersion will ensure that most particles, preferably all particles, of the polyhalogenated copolymer are in contact with the binder polymer. If high shear mixing is carried out so as to adequately disperse the polyhalogenated copolymer within the binder polymer, then after film casting or extrusion and solvent vaporization the unheated film will maintain overall film integrity. Film integrity at this stage of the process is assured by the presence of adequate amounts of the binder polymer as described above. In the event the binder polymer and the polyhalogenated copolymer are not intimately dispersed, it is believed that the polyhalogenated copolymer microparticles which are separated from contact with the binder polymer cannot form a film having sufficient film integrity. High shear mixing is carried out using a Henshel mixer, a Banbury mixer, a Dispax emulsifier, a ribbon blender or the like. It is necessary that relatively low temperatures, i.e., well below the flow temperatures of either the polyhalogenated copolymer or the binder polymer, be employed both during solvent vaporization and during mixing in order to ensure that the microparticles are not fused or solubilized, i.e., that the polyhalogenated copolymer particles maintain their essentially particulate nature. In fact, it is necessary that the polyhalogenated copolymer particles maintain their full particulate nature until they are calendered or heated. If the particulate nature of the polyhalogenated copolymer microparticles is destroyed then the unique, uniform, small sized, pores of the instant invention are not achieved in the final film.

Following preparation of the polyhalogenated copolymer/binder polymer blend, in order to prevent contamination or solvent loss the solution/dispersion should be sealed.

In addition, throughout the entirety of the process described herein, it is necessary that each step be carried out in a clean, dust free environment, otherwise, dust or dirt particles may introduce undesirable flaws in the microporous films of the instant invention.

After preparation of the above casting solution/dispersion or dope, a film is formed from the solution/dispersion. The viscosity of the casting solution or dope and thereby the solids content of the casting solution or dope is chosen depending upon the type of film formation process which is utilized. Where a simple casting procedure is employed, i.e., where the solution/dispersion is simply poured onto a temporary substrate and spread with a casting device such as a knife, lower viscosity, lower solids casting solutions are chosen, of course taking into account the binders and solvents which are selected and following procedures well known in the art. Again, the ultimate viscosity of the extrusion dope is chosen depending upon the particular extrusion equipment which is employed according to procedures well known in the art. Regardless of whether the film is cast or extruded, it is essential that relatively low temperatures—well below the flow temperature of either the binder polymer or the polyhalogenated copolymer be chosen, for the reasons explained above.

Regardless of whether the film is cast or extruded the film will be formed onto a substrate utilizing procedures well known in the art. While glass, metal or plastic substrates may be used, silicone coated paper is particularly preferred.

After the film is cast or extruded, the solvent/dispersing medium is evaporated by drying using conventional methods. Again, however, the temperature which is chosen must be well below the flow temperature of either the binder polymer or the polyhalogenated copolymer. For example, where the polyhalogenated copolymer and the binder polymer have flow temperatures of about 250°–275° C., it is preferred that temperatures no higher than about 225° C., preferably no higher than about 200° C. be employed.

The films which are formed according to the process of the instant invention can have an initial thickness of up to about 5 to 10 mils, preferably two to five mils although thinner or thicker films may be formed using the process described herein.

After the film has been formed and the solvent and other volatiles fully evaporated, it is necessary that the film be heat treated, preferably by calendering in order to cause irreversible, partial, agglomeration of the microparticles of the polyhalogenated copolymer described herein. By partial, irreversible agglomeration, it is meant that the microparticles which are in contact with each other will, at the point of contact, neck over or flow into an adjacent microparticle. However, the individual microparticles will still have a discernible particulate shape remaining in those areas where there has been no necking or direct particle flow. If full coalescence or melting of the microparticles of polyhalogenated copolymer occurs then the films prepared according to the instant invention will not have the unique microporous character defined above.

It is also necessary that any heating which occurs be uniform in nature. In the event that heating is non-uniform and results in the film having both hot and cold spots, in the cold spots—the spots where heating above the melting point of the polyhalogenated copolymer does not occur—the final film may lack film integrity And in those locations where the film was too hot and where the microparticles completely coalesced, and did not simply neck over only at points of immediately adjacent contact, the final film will have no microporous character.

Prior to the calendering step, it is frequently useful to preheat the film to a temperature of about the melting or flow temperature of the polyhalogenated copolymer for a short period of time from about 15 to 30 seconds to remove any remaining volatiles. This additional heating step can be accomplished by a heating oven or by heating by use of a hot shoe, hot roll or any other conventional preheating process well known in the industry In general the temperature which is chosen for heating or calendering should be at or slightly above, i.e., up to 25° C. above, the melting point or flow temperature of the polyhalogenated copolymer. The time during which the film should be heated at this temperature will vary depending upon the degree of microporous character which is desired in the final film. Where great porosity is desired lesser heating is employed. In general, heating should be for periods in the range of up to about five minutes or for a long enough period of time to assure that the microparticles partially irreversible agglomerate The degree of exposure will also depend upon the film thickness, with thicker films requiring great exposure to heat. Heating may be carried out by radiant heat or by any other source of heat. However, it is essential that the heating be uniform in order to assure uniform film characteristics as explained above. Preferably, heat is supplied by a heated roll and most preferably heating is carried out in conjunction with pressure, i.e., through a calendering process or a convergant die.

Calendering pressure and conditions will depend upon the nature of the film being treated, the nature of the film desired, the properties of the film and other factors. With increased pressure, generally, the porosity of the final microporous film decreases. In the usual case, calendering is carried out at compression pressures in the range of about 500 to 2000 pounds per linear inch. Exposure to the calendering roll is usually carried out for time periods ranging from fractions of a second to several seconds. Typical calendering roll treatment speeds can be about one-half to five meters per minute or higher. The compression ratio which is defined as a ratio of the thickness of the as-formed film to the thickness of the film after calendering may vary. However, preferably, the compression ratio should not exceed about 2.5 to 1.0.

The calendered film is then treated with a solvent which will dissolve and extract virtually all of the binder polymer. Typically, no more than about five percent, preferably no more than about 1.5 percent of the binder polymer is left behind, after extraction. If higher levels of the binder polymer are left behind after extraction, the binder polymer which remains may leach out or may degrade in the corrosive atmosphere in which the polyhalogenated copolymer films of the instant invention are designed to operate. Extraction may be carried out according to methods well known in the art for forming microporous membranes. For example, the film of the instant invention may simply be immersed in a bath of the leaching solvent and left in the bath until the binder polymer is dissolved. Instead of employing a batch method, it is possible to employ a continuous method utilizing a countercurrent multistaged method of polymer extraction.

The solvents which are useful for extraction include any solvents in which the binder polymer is soluble but the polyhalogenated copolymer is insoluble. In general, the extraction solvent will be the same as the solvent in which the binder polymer was dissolved before blending with the polyhalogenated copolymer. For example, when the binder polymer is polyethyloxazoline (PEOX), it can be extracted by the use of water or acetone, although water is the preferred solvent for extraction. The period of time necessary for extraction of the PEOX will depend upon the amount of the PEOX that is contained in the material but preferably the extraction should take from about 10 to about 60 minutes or more. Even with concentrations of PEOX of about 50 percent, with an extraction time of 60 minutes, the amount of PEOX remaining after extraction will be 1.7 percent or less. As the film is being washed to extract the binder polymer, the washing solution should be changed at a regular interval to speed up the extraction process. Because of the nature of polymer stick and the reduced surface area of PEOX in warm water (i.e. about 70° C.) as opposed to room temperature (i.e. about 24° C.), the extraction solution for PEOX should be maintained at approximate room temperature. Other materials than water may also be used as extraction solution such as acetone, acetone with water or methylene chloride. While some improved extraction capacity may be achieved by the use of methylene chloride, sufficient extraction occurs with water to avoid the use of methylene chloride.

After the extraction process is completed the film is dried and stored for use.

The microporous films of the instant invention have good porosities and are essentially free from pinholes. In general, the films of the instant invention will have porosities of up to about 75 percent, preferably about 30 to about 60 percent and most preferably about 45 to about 55 percent. As pointed out above, the pore surface diameter range of the films of the instant invention is narrow, i.e., at least 50 percent, preferably at least 65 percent and, most preferably, at least 75 percent of the pores will be within about 2.0 microns and preferably no more than about 1.0 micron of each other with overall average pore diameters being less than about 2.0 microns, preferably less than about 1.0 micron. The mean pore surface diameter of the films of the instant invention is determined by use of an electron microscope.

The porosity of the ETFE film can be controlled to a certain extent by varying the percentage of the ETFE to the PEOX. As the amount of PEOX increased the gurley number decreased with gurley numbers between 0.3 and 2.0 from films produced using a 60/40 ratio between the ETFE and PEOX 200 TM if thickness is about 2 mil. The porosity of the ETFE film is also influenced by the type of PEOX that is used. As previously stated, there are three commonly used PEOX viscosities, PEOX 50 TM, PEOX 200 TM and PEOX 500 TM with the higher viscosity going to the higher number PEOX. As would be expected, the ETFE film formed using the highest number PEOX had significantly higher gurley numbers. Thus films formed from a solution of ETFE and PEOX 500 TM had a significantly higher gurley number than films formed from a film comprised of ETFE and PEOX 200 TM when the same concentration of PEOX is used. When these films were analyzed under an electron microscope the differences in the membranes made using PEOX 200 TM and PEOX 500 TM was apparent. The PEOX 200 TM yielded a more porous surface structure than the PEOX 500 TM.

Examples

EXAMPLE 1

An aqueous dispersion of an ETFE, approximately equimolar, ethylene/tetrafluoroethylene copolymer dispersed at a 19.5 percent solids level in water, manufactured by the Hoechst Corporation under the trade name Hostaflon, and having a particle size range of about 0.1 to 0.3 microns was obtained. The molecular weight of the material was relatively high and its melt index was 0. The dispersion contained 0.2 percent by weight based on the total dispersion weight of ammonium 4 perfluoroctanoate, 0.1 weight percent ammonium oxalate and 0.03 weight percent maganese acetate.

The surfactants were removed from the dispersion by adding a large volume of acetone which caused separation of the ETFE polymer from the dispersing medium The entire mixture was centrifuged and the acetone/water mixture was decanted. This procedure was employed five additional times. Following the final wash, sufficient acetone was added to the ETFE to produce a 34 weight percent solids dispersion of the ETFE polymer in acetone.

A 34 percent by weight in acetone polyethyloxazoline (PEOX) 200 TM solution was obtained from Dow Chemical. Both the ETFE dispersion and the PEOX solution were stable.

70 parts by weight of the ETFE dispersion were mixed with 30 parts by weight of the PEOX 200 TM solution under high shear and then filtered, under nitrogen, through stainless steel screens having meshes, respectively, of 100, 150, 250 and 400. The resulting blend or dope exhibited a total solids content of 34 percent by weight in acetone.

Casting was carried out by pouring the dope onto a silicone coated paper, spreading the dope to the desired film thickness with a casting knife, covering the cast film and allowing the film to air dry to produce a film of 75 microns thickness.

The dried film was then calendered at a temperature of 300° C. and a pressure of 1000 pounds per linear inch in a 10 inch diameter calender. The roll speed of the calender was 1 meter/minute and the compression ratio was 1.5 to one. Following calendering the film was immersed in a water at 25° C. bath for 60 minutes in order to leach out residual PEOX polymer.

A visual analysis of the cross-section of the film prepared in this example was carried out by electron microscope at a magnification of 10,000. The results are shown in FIG. 1.

Utilizing x-ray fluorescence, an analysis was performed on the surface of a Rayperm ® film and the film of the instant invention prepared as described above. The Rayperm ® film contained significant discernible amounts of sodium, silicon, sulfur, chlorine and potassium. The film of the instant invention showed the presence only of silicon.

The porosity of the film prepared in this example was analyzed using a Gurley Densometer and compared to the porosity of the Rayperm ® microporous film described above. As shown in Table 1 below, the film of the instant invention had a porosity which was equal or superior to that of the Rayperm ® material. Likewise, the pore size distribution for the material of this invention was far superior to either the 40 percent or the 60 percent void volume Rayperm ® microporous film.

The transverse direction mechanical properties of the microporous film prepared in this example were compared to those of the Rayperm ® film with the results shown in Table 2. As can be seen the transverse direction tensile strength of the film prepared according to the instant invention is far superior to that of the prior art, Rayperm ® microporous film.

The membrane prepared in this example was evaluated for chemical resistance by immersion in thionyl chloride/2M LiAlCl$_4$ at 70° C. for one month and compared with a similarly exposed example of the Rayperm ® film. While the film of this example was slightly yellowed, the internal microporous structure remained intact and exhibited no visible changes. The film of this example also showed a lesser loss of mechanical properties after exposure as compared to the prior art Rayperm ® film.

Moreover, the film prepared in the instant invention is isotropic in nature while the Rayperm ® film, which is typical of prior art, microporous films, is anisotropic in nature.

A sample of the film prepared in this example was employed as a battery separator in a lithium AA rechargeable battery. The battery was charged and discharged at 100 MA for 50 cycles. The membrane performed well. Good results were also obtained using this film as a separator in a lithium nonrechargeable battery.

EXAMPLE 2

Example 1 was repeated except that the amounts of PEOX were varied from 30 to 40 percent. The film properties are shown in Table 1. As can been seen, as the percentage of PEOX increases the porosity also increases substantially.

EXAMPLE 3

Example 1 was repeated except that the PEOX used was a higher molecular weight variant. The properties for 60/40 ETFE/PEOX 500 films are shown in Table 3.

TABLE 1

|  | Example 1 | Example 2 | Rayperm 40% Void Volume | Rayperm 60% Void Volume |
|---|---|---|---|---|
| Thickness (Micron) | 52.0 | 109.0 | 42 | 62 |
| Void (%) | 50–60 | 60–70 | 40 | 60 |
| Gurley (sec) | 1.6 | 1.0 | 25–40 | 6–10 |
| Surface | 0.1–5 | 0.1–5 | 1–5 | 1–5 |
| Cross-section | 0.1–2 | 0.1–2 | 1–5 | 1–5 |
| Mechanical Property | almost Isotropic | almost Isotropic | Anisotropic | very Anisotropic |

TABLE 2

| Material | Tensile Strength (Psi) | Elongation (%) | Modulus (KPsi) |
|---|---|---|---|
| Example 1 | 1500 | 18 | 18.2 |
| Rayperm 40% Void Volume | 1265 | 20.5 | 13.5 |
| Rayperm 60% Void Volume | 508 | 18.6 | 5.8 |

TABLE 3

| Cast film thickness (mil) | Thickness after calendering | Gurley No. (sec) |
|---|---|---|
| 4.0 | 2.6 | 1.1 |
| 10.0 | 4.0 | 2.1 |

What is claimed:

1. A process for the preparation of an essentially ion-free, microporous film having improved transverse direction strength comprising the following steps performed in this order:

a. blending polyhalogenated copolymer particulates, wherein the polyhalogenated copolymer is comprised of moieties having the formula —(C$_a$H$_{2a}$)— and —(C$_b$X$_{2b}$)—, wherein a is 1 to 6 and b is 1 to 6 and X is fluorine or chlorine or mixtures thereof, with a binder polymer, wherein said binder polymer is a polyethyloxazoline, using a solvent which is a nonsolvent for the polyhalogenated copolymer but a solvent for the binder polymer, to form a polyhalogenated copolymer/binder polymer blend;

b. forming a film from said blend;

c. drying said film to remove substantially all of the solvent;

d. heat treating said film to a temperature at or above the melting point of the polyhalogenated copolymer under conditions such that the polyhalogenated copolymer microparticulates at their points of mutual contact will neck together to form a relatively continuous matrix of partially agglomerated microparticles; and e. extracting substantially all of the binder polymer from the film to form a microporous film.

2. A process for the preparation of an essentially ion-free, microporous film having improved transverse direction strength comprising the following steps performed in this order:

a. blending polyhalogenated copolymer particulates, wherein the polyhalogenated copolymer is selected from the group consisting of ethylene/tetrafluoroethylene copolymers, ethylene/chlorotrifluoroethylene copolymers and mixtures thereof, wherein said particulates have a particle size of less than about 2.0 microns, with a binder polymer, wherein said binder polymer is a polyethyloxazoline, using a solvent which is nonsolvent for the polyhalogenated copolymer but a solvent for the polyethyloxazoline to form a polyhalogenated copolymer/polyethyloxazoline blend;

b. forming a film from said blend;

c. drying said film to remove substantially all of the solvent;

d. heat treating said film by calendering said film at a temperature up to about 25° C. above the melting point or flow temperature of the polyhalogenated copolymer under conditions such that the polyhalogenated copolymer microparticulates at their point of mutual contact will neck together to form a relatively continuous matrix of partially agglomerated microparticles; and e. solvent extracting substantially all of the polyethyloxazoline from the film to form a microporous film.

3. A process for the preparation of an essentially ion-free, microporous film having improved transverse direction strength comprising the following steps performed in this order:

a. blending and ethylene/tetrafluoroethylene copolymer with a binder polymer, wherein said binder polymer is a polyethyloxazoline using acetone as a solvent to form an ethylene/tetrafluoroethylene copolymer/polyethyloxazoline polymer blend wherein the polyethyloxazoline comprises about 30 to about 60 percent by weight of the solid content of the blend;

b. forming a film from said blend wherein said film is about 1 to about 10 mils in thickness;

c. drying said film to remove substantially all of the acetone solvent;

d. heat treating said film by calendering said film at a temperature up to about 15° C. above the melting point or flow temperature of the ethylene/tetrafluoroethylene copolymer and at a compression pressure in the range of about 500 to about 2,000 pounds per linear inch to partially agglomerate the microparticles; and e. solvent extracting substantially all of the polyethyloxazoline from the film to form a microporous ethylene/tetrafluoroethylene film wherein the average pore diameter of said film is less than about 2.0 microns.

4. The process of claim 1 wherein the polyhalogenated copolymer is selected from the group consisting of ethylene tetrafluoroethylene copolymers, ethylene/chlorotrifluoroethylene copolymers and mixtures thereof.

5. The process of claim 4 wherein the polyhalogenated copolymer is an ethylene/tetrafluoroethylene copolymer.

6. The process of claim 1 wherein the polyhalogenated copolymer has an average molecular weight of at least about 10,000.

7. The process of claim 2 wherein the polyhalogenated copolymer has an average molecular weight of at least about 10,000.

8. The process of claim 1 wherein the polyhalogenated copolymer has an average molecular weight of at least about 50,000.

9. The process of claim 3 wherein the polyhalogenated copolymer has an average molecular weight of at least about 50,000.

10. The process of claim 1 wherein the polyhalogenated copolymer particulates have a particulate size less than about 1.0 microns.

11. The process of claim 1 wherein the polyhalogenated copolymer particulates have a particulate size less than about 0.5 microns.

12. The process of claim 1 wherein the polyhalogenated copolymer and the binder polymer are immiscible in their melt phase.

13. The process of claim 1 wherein the polyhalogenated copolymers is insoluble in at least one solvent for the binder polymer.

14. The process of claim 1 wherein the binder polymer comprises about 20 to about 65 percent by weight of the solid content of the blend.

15. The process of claim 2 wherein the binder polymer comprises about 20 to about 65 percent by weight of the solid content of the blend.

16. The process of claim 1 wherein the binder polymer comprises about 30 to about 50 percent by weight of the solid content of the blend.

17. The process of claim 1 wherein the polyhalogenated copolymer and the binder polymer are blended together under high shear at a temperature below the flow temperature of either the binder polymer or the polyhalogenated copolymer.

18. The process of claim 2 wherein the polyhalogenated copolymer and the binder polymer are blended together under high shear at a temperature below the flow temperature of either the binder polymer or the polyhalogenated copolymer.

19. The process of claim 3 wherein the polyhalogenated copolymer and the binder polymer are blended together under high shear at a temperature below the flow temperature of either the binder polymer or the polyhalogenated copolymer.

20. The process of claim 3 wherein the film is heat treated by calendering at a temperature up to about 25° C. above the melting point or flow temperature of the polyhalogenated copolymer and at a compression pressure in the range of about 500 to about 2,000 pounds per linear inch.

21. The process of claim 1 wherein the binder polymer is removed from the film by solvent extraction.

22. The process of claim 1 wherein following extraction no more than about 5 percent by weight of the binder polymer remains in the film.

23. The process of claim 1 wherein the porosity of the film after extraction of the binder polymer is up to about 75 percent.

24. The process of claim 2 wherein the porosity of the film after extraction of the binder polymer is up to about 75 percent 25. The process of claim 3 wherein the porosity of the film after extraction of the binder polymer is up to about 75 percent.

26. The process of claim 1 wherein the average pore diameter of the film is less than about 2.0 microns.

27. The process of claim 1 wherein the average pore diameter of the film is less than about 1.0 micron.

28. The process of claim 1 wherein at least about 50 percent of the pores in the film are within about 2.0 microns of each other.

29. The process of claim 2 wherein at least about 50 percent of the pores in the film are within about 2.0 microns of each other.

30. The process of claim 3 wherein at least about 50 percent of the pores in the film are within about 2.0 microns of each other.

* * * * *